US009291115B2

(12) United States Patent
Huang et al.

(10) Patent No.: US 9,291,115 B2
(45) Date of Patent: Mar. 22, 2016

(54) VEHICLE IDLE-SPEED WARNING SYSTEM AND IDLE-SPEED DETECTION METHOD

(75) Inventors: Chun-Ming Huang, Hsinchu (TW); Chih-Chyau Yang, Hsinchu (TW); Chun-Yu Chen, Hsinchu (TW); Chien-Ming Wu, Hsinchu (TW)

(73) Assignee: National Applied Research Laboratoies, Hsinchu (TW)

( * ) Notice: Subject to any disclaimer, the term of this patent is extended or adjusted under 35 U.S.C. 154(b) by 842 days.

(21) Appl. No.: 13/594,615

(22) Filed: Aug. 24, 2012

(65) Prior Publication Data

US 2014/0012483 A1 Jan. 9, 2014

(30) Foreign Application Priority Data

Jul. 5, 2012 (TW) ............................ 101124298 A

(51) Int. Cl.

| | |
|---|---|
| ***G06G 7/70*** | (2006.01) |
| ***G06G 7/78*** | (2006.01) |
| ***F02D 41/08*** | (2006.01) |
| *G01C 21/16* | (2006.01) |
| *F02D 41/24* | (2006.01) |
| *F02D 41/22* | (2006.01) |

(52) U.S. Cl.

CPC ............ *F02D 41/08* (2013.01); *F02D 41/2403* (2013.01); *F02D 2041/228* (2013.01); *F02D 2200/501* (2013.01); *F02D 2200/701* (2013.01); *G01C 21/16* (2013.01)

(58) Field of Classification Search

CPC .......... G01C 21/16; G01C 21/00; G07C 1/30; F02D 41/22; F02D 41/2403; F02D 241/228; F02D 2200/501; F02D 2200/701

USPC ........................................ 123/198 D; 701/36

See application file for complete search history.

(56) References Cited

U.S. PATENT DOCUMENTS

| | | | | |
|---|---|---|---|---|
| 3,867,615 | A * | 2/1975 | Sioufi | G08G 1/14 377/20 |
| 3,999,372 | A * | 12/1976 | Welch | G07F 17/246 194/225 |
| 4,196,412 | A * | 4/1980 | Sluis et al. | 340/901 |
| 4,641,722 | A * | 2/1987 | Bluvstein | 180/271 |
| 4,847,776 | A * | 7/1989 | Huang | G04F 1/005 340/932.2 |
| 4,879,553 | A * | 11/1989 | Righi | B60R 1/12 340/12.18 |
| 5,796,084 | A * | 8/1998 | Olsson | G07B 15/02 235/384 |
| 6,697,714 | B1 * | 2/2004 | Hoj | B60R 13/10 340/932.2 |
| 7,310,576 | B1 * | 12/2007 | Letang | 701/112 |
| 7,431,005 | B2 * | 10/2008 | Hawkins et al. | 123/179.4 |

(Continued)

*Primary Examiner* — Thomas Moulis

(74) *Attorney, Agent, or Firm* — Juan Carlos A. Marquez; Bacon & Thomas PLLC

(57) ABSTRACT

A vehicle idle-speed warning system and vehicle idle-speed detection method thereof are provided. It is non-invasive, that is, there is no need to change or modify any part of the constructing parts in the engine compartment. The present invention can be adopted stand-alone, or be applied to existing popular apparatuses, such as GPS, driving recorders, smart handheld devices, and vehicle electronic equipments. With the composing elements of a motion information module, an input module, an output module, a timer module and an information processing module, the present invention can accurately determine whether the vehicle under surveillance is in idle state and for how long it is in the idle state, and send an alarm signal automatically. With the implementation of the present invention, drivers can always be alarmed with the vehicle idling situations to prevent possible dangers or coming tickets due to the violation of traffic regulations in certain countries.

15 Claims, 3 Drawing Sheets

(56) References Cited

U.S. PATENT DOCUMENTS

| | | | | |
|---|---|---|---|---|
| 7,463,167 | B2 * | 12/2008 | Krygler | G06Q 30/0284 194/217 |
| 7,532,108 | B2 * | 5/2009 | Sugie | B60R 25/1004 340/426.1 |
| 7,646,287 | B2 * | 1/2010 | Hayashi | B60R 25/1004 340/426.1 |
| 7,680,591 | B2 * | 3/2010 | Nagata | G01C 21/3682 701/516 |
| 7,970,527 | B2 * | 6/2011 | Nishi et al. | 701/113 |
| 8,566,159 | B2 * | 10/2013 | King | G06Q 30/02 705/14.53 |
| 8,624,756 | B2 * | 1/2014 | Ganot | G07B 15/02 340/435 |
| 8,903,600 | B2 * | 12/2014 | Nagatomo | G06Q 10/02 701/36 |
| 9,073,541 | B2 * | 7/2015 | Sugiyama | B60W 20/00 |
| 2004/0055558 | A1 * | 3/2004 | McElroy | 123/198 DC |
| 2004/0107048 | A1 * | 6/2004 | Yokota | G01C 21/343 701/431 |
| 2005/0231342 | A1 * | 10/2005 | Kim | 340/438 |
| 2005/0270178 | A1 * | 12/2005 | Ioli | 340/932.2 |
| 2007/0093954 | A1 * | 4/2007 | Malone et al. | 701/112 |
| 2007/0174222 | A1 * | 7/2007 | Daneau | F01N 9/002 706/19 |
| 2010/0217507 | A1 * | 8/2010 | Braunberger et al. | 701/112 |
| 2010/0332101 | A1 * | 12/2010 | Braunberger et al. | 701/96 |
| 2011/0062230 | A1 * | 3/2011 | Ward et al. | 235/377 |
| 2011/0106377 | A1 * | 5/2011 | Miyauchi et al. | 701/36 |
| 2011/0140927 | A1 * | 6/2011 | Lee | 340/993 |
| 2011/0166745 | A1 * | 7/2011 | Tiwari et al. | 701/34 |
| 2011/0288743 | A1 * | 11/2011 | Smith | 701/102 |
| 2011/0295486 | A1 * | 12/2011 | Guensler et al. | 701/102 |
| 2013/0151037 | A1 * | 6/2013 | Harumoto et al. | 701/2 |
| 2014/0097949 | A1 * | 4/2014 | Thompson, III | 340/441 |
| 2014/0118132 | A1 * | 5/2014 | Braunberger et al. | 340/435 |

* cited by examiner

VEHICLE IDLE-SPEED WARNING SYSTEM AND IDLE-SPEED DETECTION METHOD

BACKGROUND OF THE INVENTION

1. Technical Field

The present invention relates to vehicle idle-speed warning systems and vehicle idle-speed detection methods thereof, and more particularly, to a non-invasive vehicle idle-speed warning system and vehicle idle-speed detection method thereof.

2. Description of Related Art

Most conventional vehicle idle-speed detection devices or systems determine whether a vehicle engine is in an operation state by detecting the gear in a vehicle gearbox, sensing a torque signal or a pulse signal sent from a vehicle engine compartment, detecting the air input/or displacement of the vehicle, or monitoring the temperature in the vehicle engine compartment or its surroundings, then retrieve a speed signal from a velocity meter to determine whether the vehicle is in a motion state, and eventually calculate its duration to determine whether the vehicle is in an idle-speed state.

The aforesaid prior art does manage to determine whether a vehicle is in an idle-speed state. However, it has a notable drawback, that is, it is necessary to retrofit a vehicle engine or a vehicle electronic device in order to meet the requirements of a connected external device which usually vary from detection method to detection method. In practice, it is an unnecessary waste of resources spent on the costs and operation time incurred in the aforesaid retrofit.

Moreover, the accuracy of the aforesaid detection method varies greatly with a detection location. Furthermore, the retrofit on the vehicle body or vehicle engine compartment and additional connection thereof usually compromise the performance, stability, and safety of the vehicle, violate the warranty clauses applied to the vehicle at delivery, bring inconvenience to the drivers of the vehicle, and incur related costs and expenses.

SUMMARY OF THE INVENTION

The present invention relates to vehicle idle-speed warning systems and vehicle idle-speed detection methods thereof, and more particularly, to a non-invasive vehicle idle-speed warning system and vehicle idle-speed detection method thereof. The vehicle idle-speed warning system of the present invention comprises an input module, a timer module, a motion information module, an information processing module, and an output module. The present invention can be adopted stand-alone, or be applied to existing popular apparatuses, such as GPS, smart handheld devices, driving recorders, and vehicle electronic equipments. Given the implementation of the present invention, the drivers can know at any time whether the vehicle is in an idle-speed state to not only avoid unnecessary potential risks but also avoid being punished for violation of traffic regulations.

In order to achieve the above and other objectives, the present invention provides a vehicle idle-speed warning system disposed on a vehicle. The vehicle idle-speed warning system comprises: an input module for enabling a user to enter an idle-speed time; a timer module for calculating a duration; a motion information module for providing an engine state information and a displacement information of the vehicle; an information processing module for executing control and computation, controlling the timer module to reset the duration to zero when the displacement information indicates a displacement state, actuating the timer module to calculate the duration when the displacement information indicates a non-displacement state, and outputting an idle-speed warning information when the duration exceeds the idle-speed time and the engine state information indicates a start state; and an output module for reading the idle-speed warning information and generating a warning message.

In order to achieve the above and other objectives, the present invention further provides a vehicle idle-speed detection method, applicable to a vehicle idle-speed warning system, the vehicle idle-speed detection method comprising the steps of: reading an idle-speed time by an information processing module; reading a state information, wherein the information processing module reads an engine state information and a displacement information from a motion information module; and determining a vehicle idle-speed, wherein the information processing module outputs an idle-speed warning information when the engine state information indicates a start state, the displacement information indicates a non-displacement state, and the idle-speed time is up.

Implementation of the present invention at least involves the following inventive steps:

1. It detects and measures idle-speed information-related data accurately and generates a warning message timely to allow drivers to avoid being punished for violation of traffic regulations or avoid being confronted with a dangerous situation.

2. It is self-contained, has a value-added effect on existing smart devices, dispenses with retrofit on a vehicle body or engine, and does not involve any issues pertaining to vehicle safety and reliability.

3. It applies to various vehicle types and vehicle models and does not require vehicle manufacturers to carry out installation or certification.

The description above is only a brief summary of the technical solution of the present invention. To have a clearer understanding of the technical method of the present invention, people may carry out the invention according to the specification. For making the abovementioned objectives, other objectives, characteristics and advantages more understandable, the present invention is detailed by citing the preferred embodiments in combination with the drawings as follows.

DETAILED DESCRIPTION OF THE INVENTION

In order to further describe the technical method adopted for reaching the intended objectives and the functions of the present invention, the present invention is detailed according to embodiments, structure, characteristics and the functions of the parallel bridge circuit structure and the high-voltage parallel bridge circuit structure disclosed by the present invention in combination with the drawings and the preferred embodiments as follows.

Figure 1A:
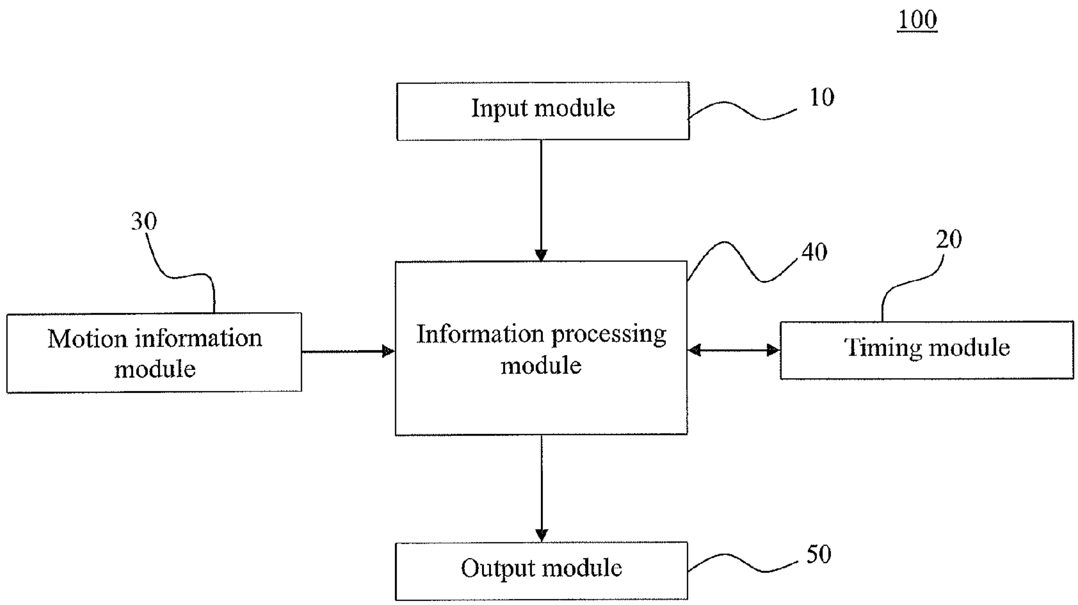
FIG. 1A is a block diagram of a vehicle idle-speed warning system according to an embodiment of the present invention.

Referring to FIG. 1A, a vehicle idle-speed warning system 100 of the present invention comprises: an input module 10;

a timer module 20; a motion information module 30; an information processing module 40; and an output module 50.

The input module 10 enables a user to enter a preset idle-speed time. The input module 10 is a 3C electronic input unit in wide use, such as a handheld device, a panel computer, or a notebook computer, or just simply an input device, such as a keyboard, a hand-writing panel, or voice-based human-machine interface.

The timer module 20 calculates time duration. The timer module 20 is a hardware circuit timer module or a software timer module, and triggers execution, reset, or stops calculating time and output duration, through a control signal.

The motion information module 30 detects and provides the engine state information and vehicle displacement information of a vehicle. The engine state information indicates whether an engine of a vehicle is in the start state. The displacement information relates to the speed of a vehicle within a duration and the distance traveled by the vehicle within the duration.

The motion information module 30 is an accelerometer, an accelerometer and a global positioning system, an accelerometer and a magnetometer, a speedometer, a speedometer and a global positioning system, a speedometer and a magnetometer, a vibration sensor and an accelerometer, a vibration sensor and a speedometer, a vibration sensor and a global positioning system, or a vibration sensor and a magnetometer Although the detection of the engine state and motion information of a vehicle by the aforesaid options of the motion information module 30 is carried out in different manners technically, it requires no retrofit on the vehicle body or engine, involves no issue pertaining to vehicle safety and reliability, applies to all vehicle types and vehicle models, dispenses with installation or certification otherwise performed by vehicle manufacturers, and breaks no vehicle retrofit regulations.

The information processing module 40 executes control and computation, controls the timer module 20 to reset the duration to zero when the displacement information indicates a displacement state, actuates the timer module 20 to calculate the duration when the displacement information indicates a non-displacement state, and outputs an idle-speed warning information when the duration exceeds the idle-speed time and the engine state information indicates a start state.

The information processing module 40 is a smart handheld device, a panel computer, a notebook computer, an embedded computer, or a satellite navigation device. Alternatively, the information processing module 40 can be a vehicle computer, provided that the vehicle computer is connected conveniently and safely.

The output module 50 reads the idle-speed warning information that originates from the information processing module 40 and generates an idle-speed warning message to inform the user that the vehicle has entered a dangerous idle-speed state. The warning message is a sound signal, a vision signal, a vibration signal, or a mixed signal that consists of at least two thereof.

Figure 1B:
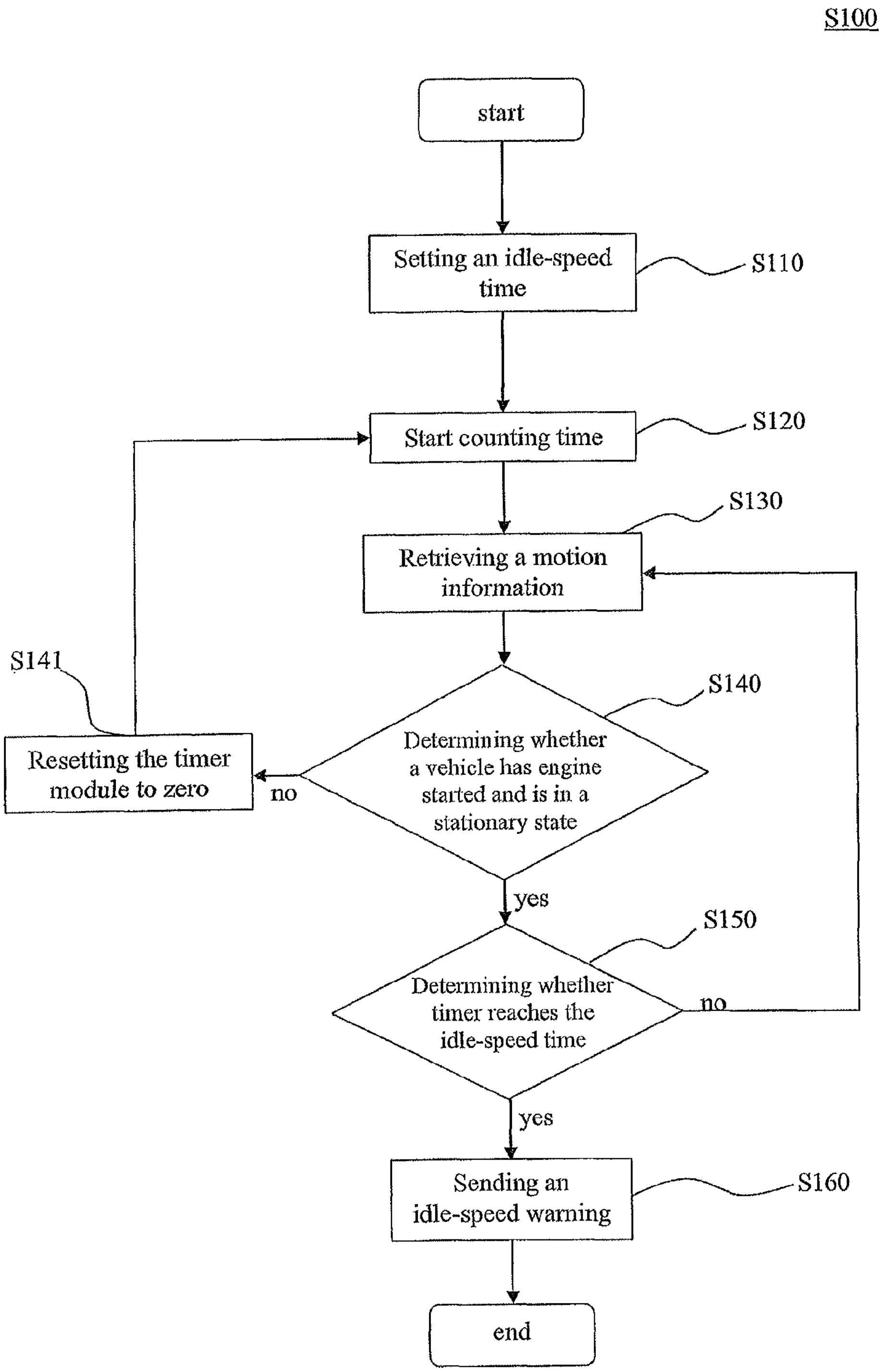
FIG. 1B is an operation flow chart of the vehicle idle-speed warning system according to an embodiment of the present invention.

Referring to FIG. 1B, there is shown an operation flow chart S100 of the vehicle idle-speed warning system 100 according to an embodiment of the present invention. The flow chart S100 shows the steps of: setting an idle-speed time (S110); starting timer (S120); retrieving a motion information (S130); determining whether a vehicle has engine started and is in a stationary state (S140); determining whether timer reaches the idle-speed time (S150); and sending an idle-speed warning (S160) in case of an idle-speed state.

In the step of setting idle-speed time (S110), the user sets an idle-speed time with the input module 10. In the step of starting timer (S120), the information processing module 40 controls the timer module 20 to start calculating the time. The step of retrieving a motion information (S130) involves detecting the engine state information and vehicle displacement information by the motion information module 30 and performing retrieval and computation by the information processing module 40.

The unique "requires only one single sensor" feature of the present invention can be best illustrated by an example of a vehicle warning system disposed on a vehicle for parking with engine running with only one single sensor, an accelerator. The accelerator detects the accelerating data of each axis in the X, Y and Z direction (X is the forward direction of the vehicle in 3- dimensional X-Y-Z coordinate), then a simple 3-dimensional FFT (fast Fourier transform a) analyzes the spectrum of the data and decides whether the spectrum characteristics of a running engine or a running air conditioner is detected when there is no X-direction acceleration (the vehicle is not moving).

Afterward, the information processing module 40 executes the step of determining whether the vehicle has engine started and is in a stationary state (S140) according to a computation result. In response to a negative determination at the end of step S140, the information processing module 40 controls the timer module 20 to execute the step of resetting the timer module to zero (S141), and then the process flow goes back to the step of starting timer (S120) to continue with the flow chart S100. If step S140 yields an affirmative determination, the process flow will go to the step of determining whether timer reaches an idle-speed time (S150).

If the step of determining whether a calculation time reaches an idle-speed time (S150) yields an affirmative determination, the information processing module 40 will control the output module 50 to execute the step of sending an idle-speed warning (S160). If the step of determining whether timer reaches an idle-speed time (S150) yields a negative determination, the process flow will go back to the step of retrieving a motion information (S130) to continue with the flow chart S100.

Figure 2:
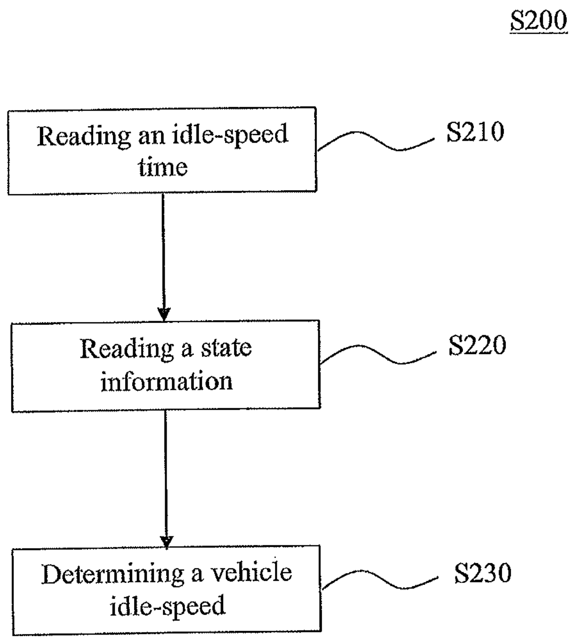
FIG. 2 is a schematic view of the process flow of a vehicle idle-speed detection method according to an embodiment of the present invention.

Referring to FIG. 2, there is shown a schematic view of the process flow of a vehicle idle-speed detection method S200 according to an embodiment of the present invention. The vehicle idle-speed detection method S200 is applicable to the vehicle idle-speed warning system 100. The vehicle idle-speed detection method S200 comprises the steps of: reading an idle-speed time (step S210); reading a state information (step S220); and determining a vehicle idle-speed (step S230).

In the step of reading an idle-speed time (step S210), the information processing module 40 reads an idle-speed time set by the user with the input module 10 beforehand.

The step of reading a state information (step S220) involves reading an engine state information and a displacement information from the motion information module 30 by the information processing module 40. The motion information module 30 is an accelerometer, an accelerometer and a global positioning system, an accelerometer and a magnetometer, a speedometer, a speedometer and a global positioning system, a speedometer and a magnetometer, a vibration sensor and an accelerometer, a vibration sensor and a speedometer, a vibration sensor and a global positioning system, or a vibration sensor and a magnetometer.

In the step of determining a vehicle idle-speed (step S230), which is executed by the information processing module 40, the information processing module 40 sends an idle-speed warning information to the output module 50 such that the output module 50 generates an idle-speed warning message, if the vehicle engine state information indicates a start state, the displacement information indicates a non-displacement state, and the preset idle-speed time is up.

The description above is only the preferred embodiments of the present invention other than the restrictions to the present invention. Though the present invention is disclosed by the preferred embodiments above, they are not intended to restrict the present invention. The alterations or modifications made by those skilled in this art without departing from the technical scope disclosed by the present invention above are considered as the equivalent embodiments with slight changes or modifications based on the technical contents disclosed above. Such simple revisions, equivalent changes and modifications are all within the scope of the technical solution of the present invention.

What is claimed is:

1. A vehicle warning system disposed on a vehicle, for parking with engine running, the vehicle warning system comprising:

an input module for enabling a user to enter a preset time;

a timer module for calculating a duration;

a motion information module for providing an engine state information and a displacement information of the vehicle, the motion information module including a single sensor configured to detect a start state of an engine of the vehicle and a speed of the vehicle within a predetermined duration and distance traveled by the vehicle, wherein the motion information module dermines the engine state information and the displacement information in response to the single sensor;

an information processing module for executing control and computation, controlling the timing module to reset the duration to zero when the displacement information indicates a displacement state, actuating the timing module to calculate the duration when the displacement information indicates a non-displacement state, and outputting warning information when the duration exceeds the preset time and the engine state information indicates a running state; and an output module for reading the warning information and generating a warning message.

2. The vehicle warning system of claim 1, wherein the timing module is a circuit module.

3. The vehicle warning system of claim 1, wherein the timing module is a software module.

4. The vehicle warning system of claim 1, wherein the motion information module is an accelerometer.

5. The vehicle warning system of claim 1, wherein the motion information module comprises an accelerometer and a global positioning system.

6. The vehicle warning system of claim 1, wherein the motion information module comprises an accelerometer and a magnetometer.

7. The vehicle warning system of claim 1, wherein the motion information module is a speedometer.

8. The vehicle warning system of claim 1, wherein the motion information module comprises a speedometer and a global positioning system.

9. The vehicle warning system of claim 1, wherein the motion information module comprises a speedometer and a magnetometer.

10. The vehicle warning system of claim 1, wherein the motion information module comprises a vibration sensor and an accelerometer.

11. The vehicle warning system of claim 1, wherein the motion information module comprises a vibration sensor and a speedometer.

12. The vehicle warning system of claim 1, wherein the motion information module comprises a vibration sensor and a global positioning system.

13. The vehicle warning system of claim 1, wherein the motion information module comprises a vibration sensor and a magnetometer.

14. The vehicle warning system of claim 1, wherein the warning message is one of a sound signal, a vision signal, a vibration signal, and a mixed signal consisting of at least two thereof.

15. A detection method, applicable to a vehicle warning system, the detection method comprising the steps of:

providing a single sensor for detecting a start state of an engine of the vehicle and a speed of the vehicle within a predetermined duration and distance traveled by the vehicle;

determining via a motion information module engine state information and displacement information in response to the single sensor;

reading a preset time by an information processing module;

reading a state information, wherein the information processing module reads the engine state information and the displacement information from the motion information module; and determining a vehicle idle-speed, wherein the information processing module outputs warning information when the engine state information indicates a start state, the displacement information indicates a non-displacement state, and a parking duration of the vehicle exceeds the preset time.

* * * * *